United States Patent [19]

Surles

[11] Patent Number: 5,806,593
[45] Date of Patent: Sep. 15, 1998

[54] METHOD TO INCREASE SAND GRAIN COATING COVERAGE

[75] Inventor: Billy Wayne Surles, Houston, Tex.

[73] Assignee: Texaco Inc, White Plains, N.Y.

[21] Appl. No.: 684,783

[22] Filed: Jul. 22, 1996

[51] Int. Cl.⁶ .................................................. E21B 33/138
[52] U.S. Cl. ........................ 166/270; 166/295; 166/300
[58] Field of Search .................................. 166/270, 295, 166/300, 403

[56] References Cited

U.S. PATENT DOCUMENTS

| | | | |
|---|---|---|---|
| Re. 32,649 | 4/1988 | Brandt et al. | 604/368 |
| 2,810,716 | 10/1957 | Markus | 260/88.1 |
| 2,873,181 | 2/1959 | Hanford | 51/298 |
| 3,041,156 | 6/1962 | Rowse et al. | 51/298 |
| 3,098,730 | 7/1963 | Rowse | 51/298 |
| 3,229,769 | 1/1966 | Bashaw et al. | 169/1 |
| 3,669,103 | 6/1972 | Harper et al. | 128/156 |
| 3,901,236 | 8/1975 | Assarsson et al. | 128/284 |
| 3,935,099 | 1/1976 | Weaver et al. | 210/43 |
| 3,997,484 | 12/1976 | Weaver et al. | 260/17.4 |
| 4,026,817 | 5/1977 | Ciuti et al. | 252/312 |
| 4,042,032 | 8/1977 | Anderson et al. | 166/276 |
| 4,076,663 | 2/1978 | Masuda et al. | 260/17.4 |
| 4,115,332 | 9/1978 | Young et al. | 260/17.4 |
| 4,159,260 | 6/1979 | Jones et al. | 260/17.4 |
| 4,286,082 | 8/1981 | Tsubakimoto et al. | 526/240 |
| 4,340,706 | 7/1982 | Obayashi et al. | 526/207 |
| 4,427,069 | 1/1984 | Friedman | 166/295 |
| 4,473,671 | 9/1984 | Green | 523/105 |
| 4,473,689 | 9/1984 | Login et al. | 526/81 |
| 4,535,098 | 8/1985 | Evani et al. | 521/149 |
| 4,539,048 | 9/1985 | Cohen | 106/287.17 |
| 4,548,847 | 10/1985 | Aberson et al. | 428/74 |
| 4,699,543 | 10/1987 | Mio et al. | 404/109 |
| 4,800,960 | 1/1989 | Friedman et al. | 166/276 |
| 4,817,720 | 4/1989 | Friedman et al. | 166/295 |
| 4,842,072 | 6/1989 | Friedman et al. | 166/295 |
| 4,895,207 | 1/1990 | Friedman et al. | 166/276 |
| 4,898,750 | 2/1990 | Friedman et al. | 427/221 |
| 4,903,770 | 2/1990 | Friedman et al. | 166/288 |
| 4,938,287 | 7/1990 | Friedman et al. | 166/288 |
| 4,964,465 | 10/1990 | Surles | 166/295 |
| 5,010,953 | 4/1991 | Friedman et al. | 166/288 |
| 5,040,604 | 8/1991 | Friedman et al. | 166/295 |
| 5,147,343 | 9/1992 | Kellenberger | 604/368 |
| 5,159,980 | 11/1992 | Onan et al. | 166/294 |
| 5,199,490 | 4/1993 | Surles et al. | 166/270 |
| 5,199,492 | 4/1993 | Surles et al. | 166/295 |
| 5,284,206 | 2/1994 | Surles et al. | 166/270 |
| 5,285,849 | 2/1994 | Surles et al. | 166/295 |
| 5,293,939 | 3/1994 | Surles et al. | 166/295 |
| 5,377,759 | 1/1995 | Surles | 166/295 |
| 5,423,381 | 6/1995 | Surles et al. | 166/295 |
| 5,520,251 | 5/1996 | Surles et al. | 166/307 |
| 5,522,460 | 6/1996 | Shu | 166/295 |
| 5,551,513 | 9/1996 | Surles et al. | 166/278 |
| 5,567,088 | 10/1996 | Shotts et al. | 405/270 |

FOREIGN PATENT DOCUMENTS

| | | | |
|---|---|---|---|
| 3313344 | 10/1984 | Germany | B01J 20/30 |
| 719330 | 12/1954 | United Kingdom | 2/5 |

OTHER PUBLICATIONS

Edwin P. Plueddemann, *Silane Coupling Agents*, Plenum Press, N.Y. 1982, Table of Contents and Chapters 1, 3, 6, & 7.

"Furan Derivatives", Encyclopedia of Chemical Technology, vol. 11, pp. 510–516.

Chen et al., "Synthetic and Natural Polymers," Chapter VI (pp. 197–216) of Absorbency, Edited by Pronoy K. Chatterjee, Elsevier Science Publishers B.V., Amsterdam, The Netherlands, 1985.

Results of Lexis Search conducted on Nov. 27, 1996 by Carter White.

*Primary Examiner*—Roger J. Schoeppel
*Attorney, Agent, or Firm*—Henry H. Gibson; Arnold, White & Durkee

[57] ABSTRACT

A method for consolidating unconsolidated mineral particles in a subterranean petroleum formation penetrated by a well in fluid communication with at least a portion of the formation, including:

a) introducing an effective amount of preflush into the formation sufficient to invade substantially all of the pore spaces of a portion of the formation to be consolidated, said preflush including an ester, and an oligomer or monomer of the compound from which the resin to be used in the consolidation is obtained, an ester, and an effective amount of a coupling agent;

b) introducing a sand consolidating fluid into substantially the same portion of the formation as the preflush fluid, the sand consolidating fluid containing a polymerizable compound, a diluent for the polymerizable compound and an acid catalyst capable of causing condensation polymerization of the compound at fluid injection temperatures; and c) allowing the injected fluid to remain in the formation for a period of time sufficient to accomplish at least partial polymerization of the monomer, forming a permeable consolidated mass around the wellbore.

16 Claims, No Drawings

METHOD TO INCREASE SAND GRAIN COATING COVERAGE

FIELD OF THE INVENTION

This invention is related to sand consolidation methods in which wells are treated to bind unconsolidated matter together in the portions of the formation immediately adjacent to the perforations of the well to form a stable, yet fluid permeable barrier around the wellbore and to facilitate production of fluids from the formation, while restraining the movement of sand into the well. Still more particularly, this invention relates to a method of treating particulate matter, such as sand or gravel, to increase the area of coverage to as close to 100% of the surface area of the particles as possible. Currently, in sand consolidation, improved resin systems are available which can better withstand chemicals used in treating wells, however it has been very difficult to achieve complete coverage of the surface area of the sand or other particulates. Any surface area which is not covered detracts from the integrity of the system, because the untreated area constitutes a weak point where the barrier might be more easily compromised.

BACKGROUND OF THE INVENTION

Sand consolidation is a well known term which applies to procedures routinely practiced in the commercial production of petroleum, where wells are treated in order to reduce a problem generally referred to as unconsolidated sand production. When wells are completed in petroleum-containing formations which also contain unconsolidated granular mineral material such as sand or gravel, production of fluids from the formation causes the flow of the particulate matter into the wellbore, which often leads to any of several difficult and expensive problems. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which destroys the well by causing its collapse. All of these problems are known to exist and many methods have been disclosed in the art and applied in oil fields in order to reduce or eliminate production of unconsolidated sand from a petroleum formation during the course of oil production.

The above-described problems and potential solutions to the problems have been the subject of extensive research by the petroleum industry in the hope of developing techniques which minimize or eliminate the movement of sand particles into the producing well and associated equipment during the course of producing fluids from the formation. One such general approach suggested in the art involves treating the porous, unconsolidated mass sand around the wellbore in order to cement the loose sand grains together, thereby forming a permeable consolidated sand mass which will allow production of fluids but which will restrain the movement of sand particles into the wellbore. The objective of such procedures is to create a permeable barrier or sieve adjacent to the perforations or other openings in the well casing which establish communication between the production formation and the production tubing, which restrains the flow of loose particulate mineral matter such as sand. Another approach involves removing a portion of the formation around the well and packing specially prepared resin-coated granular material into the formation around the wellbore and subsequently causing it to be cemented together.

It is a primary objective of any operable sand consolidation method that a barrier be formed around the wellbore which restrains the movement of sand particles into the well while offering little or no restriction to the flow of fluids, particularly oil, from the formation into the wellbore where it can be pumped to the surface of the earth.

In-situ chemical sand consolidation operations are typically comprised of three basic steps: a preflush, the treatment, and a postflush.

Many materials have been utilized in treatments for consolidating sand in formations adjacent to production of wellbores. One of the more successful agents utilized for this purpose is fluid comprising monomers or oligomers of furfuryl alcohol which can be polymerized in situ to form a solid matrix which binds the sand grains together, while, at the same time, offering superior resistance to high temperatures and to caustic substances which may be encountered in steam flood operations.

A very important aspect of a satisfactory sand consolidation method, which is the focus of the work described in the present invention, is stability of the permeable barrier. The stability would depend to a large extent on how well the sand grains are actually coated with the resin. Once the barrier is formed and the well is placed on production, there will be a substantial continuing flow of fluids through the flow channels within the permeable barrier, and it is important that the barrier last for a significant period of time, e.g. several months and preferably years, without excessive abrasive wear or other deterioration of the consolidation matrix which would allow the particulate matter to once again flow into the wellbore. This is a particularly difficult objective to accomplish in the instance of sand consolidation procedures applied to wells completed in formations subjected to steam flooding or other thermal recovery methods. The production of fluids in steam flooding operations involve higher temperatures and higher pH fluids than are normally encountered in ordinary primary production, and this greatly aggravates the stability problem of sand consolidation procedures.

Several references in the art disclose resin systems with improvements which are targeted to improve the coating of sand grains by the consolidation resin.

In U.S. Pat. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to the resin containing fluid injection. The salt absorbs on sand grains, and sufficient acidic salt remains adsorbed on the sand grain during the subsequent resin fluid injection stage that adequate polymerization occurs. Although this has been very effective in most difficult situations where sand consolidation procedures are utilized, particularly in connection with thermal flooding such as steam injection procedures, the procedure nevertheless requires a multi-fluid injection procedure which requires more time and is more expensive than would be desirable. Usually a preliminary sand cleaning step is required before injecting the aqueous-catalyst solution in order to remove the naturally-occurring oil film from the sand grains to ensure good catalyst adsorption on the sand. Also, although catalyst mixes with the subsequently injected polymer to a limited degree, usually sufficient to cause polymerization, it is believed that superior performance would result if the catalyst resin mixture could be made more homogenous prior to polymerization, in order to achieve a dense, strong, durable consolidation mass.

In U.S. Pat. No. 4,938,287, incorporated by reference herein in its entirety, there is disclosed a method for consolidating unconsolidated mineral particles including sand in a subterranean petroleum formation penetrated by a well in fluid communication with at least a portion of the formation, comprising introducing an effective amount of preflush into the formation sufficient to invade substantially all of the pore space of the portion of the formation to be consolidated, said preflush fluid comprising an ester which is a solvent for oil residue on the sand grains and also removes at least a portion of water present in the pore spaces of the formation.

There remains in the art a need for a method to promote more complete coverage of the sand grains by the resin compositions. Currently such chemicals as diesel, esters, alcohols and many other organic materials are used in a preflush step preparation for the resin. While these materials do a good job of cleaning the "face" of the sand, they do very little to promote complete coverage of the chemical upon the sand face. In fact, a typical sand grain that has been exposed to an in-situ treatment is only covered over approximately 40% of its surface. The fact that large portions of the grain are uncoated promotes degradation of the consolidation via fluid getting under the resin and "flicking" it off the sand grain. Furthermore, if the resin was applied to provide the sand grain with some protection against alkaline dissolution, it is obvious that any uncoated surface area on the sand grain is still subject to attack.

SUMMARY OF THE INVENTION

This invention concerns an improvement in a method for consolidating sand in subterranean formations penetrated by wells. The sand consolidation methods utilized in my invention include those which employ a monomer or oligomer which undergoes a condensation polymerization in the formation where the sand consolidation is to be achieved. The improvement comprises introducing an effective amount of preflush into the formation comprising 80–20% of a monomer from which the resin is made, or resin, 20–80% ester, and 1–2% coupling agent, and subsequently introducing a sand consolidating fluid into substantially the same portion of the formation as the preflush fluid, said sand consolidating fluid containing a polymerizable compound, a diluent for the polymerizable compound and an acid catalyst capable of causing condensation polymerization of the compound at fluid injection temperatures; and allowing the injected fluid to remain in the formation for a period of time sufficient to accomplish at least partial polymerization of the monomer, forming a permeable consolidated mass.

DETAILED DESCRIPTION OF THE INVENTION

The present invention concerns improvements in sand consolidation methods of the type disclosed in U.S. Pat. Nos. 4,938,287 supra; and 5,010,953; 5,199,490; and 5,199,492, incorporated herein by reference in their entirety, employing a polymerizable monomer or oligomer, a catalyst for the polymerization of the monomer or oligomer, an organic diluent and, in some embodiments an ester such as ethyl or butyl acetate. In the present invention a preflush is introduced which functions to dissolve undesirable oil and residue from the particles while, at the same time, preparing the surface of the particles to accept more consolidating resin.

In the present invention I have found the preflush should preferably comprise a monomer or oligomer from which the resin to be used in the coating stage is made, an ester, and a coupling agent.

In a less preferred embodiment the preflush can comprise solely the monomer or oligomer of the compound from which the resin to be used in the coating step was made.

The preflush contains 20 to 80% ester, preferably 60 to 80%, say about 80%; 80 to 20 % furan, preferably 40 to 20%, say about 20%; and 1 to 5% coupling agent, preferably 1 to 2%, say about 1%.

Monomer

The monomer from which the resin is made which I have found to be preferred in the invention is furfuryl alcohol. Any monomer which will polymerize upon exposure to heat and contact with an acid catalyst can be used in this process; however, furfuryl alcohol ($C_4H_3OCH_2O$) is the particularly preferred polymerizable monomer. This material has the advantage of being relatively inexpensive and having the characteristics of autopolymerizing on exposure to acid catalyst and forming a thermal setting resin which cures to an insoluble mass which is highly resistant to chemical attack as well as to thermal degradation.

The monomer can also comprise furfural. The choice of monomer, furfuryl alcohol or furfural, may depend upon whether there is a reason to accelerate the polymerization reaction at the sand grain surface. Furfuryl alcohol will accelerate the polymerization reaction because it is much more reactive than the resin. This is because it has approximately 14 times the reactive sites on a mole basis as does the resin. On the other hand, furfural will not accelerate the reaction, because it is not acid catalyzed. One reason why one might want an accelerated set time(use furfuryl alcohol) is when one is working in a high pressure environment and the resin could flow back if it is not rapidly set downhole. One case where one would not wish to accelerate the reaction(use furfural) would be where a proper postflush to restore permeability could not be accomplished if the reaction was accelerated.

Ester

Any low molecular weight hydrocarbon ester may be used in the preflush mixture of the present process. Alkyl acetates having up to six carbons work well. Particularly preferred species are ethyl acetate or butyl acetate, because of their effectiveness, low cost, and wide-spread availability.

Coupling Agents

Coupling agents are discussed in U.S. Pat. Nos. 2,873,181; 3,041,156; 3,098,730; 4,473,671; and 4,539,048, all incorporated herein by reference. There are three major types of coupling agents of particular interest herein: silanes, titanates, and zircoaluminates. Silanes are by far the most readily available and widely studied. Useable silane coupling agents generally correspond to the formula: $X_3SiR^1Y$, wherein:

$R^1$ is an alkyl group,

Y is an organofunctional group; and

X is a hydrolyzable group.

Silane coupling agents are discussed in U.S. Pat. No. 3,079,361; incorporated herein by reference. The organofunctional group (Y) may be any of the variety of groups which can react with the resinous adhesive during curing, or which are otherwise sufficiently compatible with the resinous adhesive to form an bonding-like association therewith. Organofunctional groups which function as Y include: amino-, epoxy-, vinyl-, methacryloxy-, mercapto-, ureido- and methacrylate-groups. Examples of silane coupling agents are described in Plueddmann, Silane Coupling Agents, Plemum Press, New York (1982), incorporated herein by reference.

The exact nature of the bonding or association between the hydrolyzable group (X) and the inorganic filler is not fully understood, and may differ for various fillers. For fillers that contain silica, it may be theorized that an Si—O—Si linkage occurs, via reaction of the hydrolyzable group from the coupling agent with a hydroxyl group on the inorganic filler surface. It will be understood that the particular nature of the associative interaction is not critical, to the invention, and it is not intended that the present invention be limited to any particular theory, or type, of interaction. It is noted, however, that the nature of the associative interaction will tend to affect performance and processing.

The hydrolyzable group(s) on the silane can be any of a variety of hydrolyzable groups. The term "hydrolyzable group" and variants thereof, is meant to refer, for example, to any moiety which may be bonded to silicon through a silicon-halogen bond, a silicon-oxygen bond, a silicon-nitrogen bond or a silicon-sulfur bond. Specific examples of hydrolyzable silanes are those in which X is: a halogen, such as chlorine, bromine, or iodine; —OR, where R is a monovalent hydrocarbon or a monovalent halohydrocarbon radical such as a methyl-, ethyl-, octadecyl-, vinyl-, allyl-, hexenyl-, cyclohexyl-, cyclopentyl-, phenyl-, tolyl-, xylyl-, benzyl-, chloroethyl-, trifluoropropyl-, chlorophenyl-, bromocyclohexyl-, iodonaphthyl-, or chlorovinyl-group; —OR where R is a hydroxyhydrocarbon radical such as betahydroxyethyl-, beta-hydroxylpropyl-, omega-hydroxyoctandecyl-, para-hydroxypyhenyl-, hydroxycyclohexyl or beta-gamma dihydroxypropyl-; —OR where R is an etherated hydrocarbon or halohydrocarbon radical having the formula $OR^2)_z OW$, where $R^2$ is hydrocarbon or halohydrocarbon and W is hydrocarbon or H, such as those derived from polyethylene glycols or polypropylene glycols and their monohydrocarbon ethers, and in which z is an integer such as 2, 5, 8 or 10 or, those derived from halogenated glycols such as chloropropylene glycol; or, amino radicals in which the nitrogen is bonded to the silicon, for example as dimethylamino-, methylamino- compounds; and sulfonated radicals containing the Si—S bond such as —SH or —SR compounds, where R is a monovalent organic radical such as a methyl-, ethyl-, or chlorobutyl-group, etc.

There is no requirement that all groups X in $X_3SiR^1 Y$ compounds be the same. Further, mixtures of coupling agents may be used. The silane can be monomeric material, that is a silane in which all groups X are monovalent radicals; or the silane may be a polymeric material, that is a silane in which at least one group X is a polyvalent radical. Thus, for example, the silane can be in form of a silazane in which the silicons are bonded through nitrogen atoms and each silicon has one beta-(vinylphenyl)ethyl group attached thereto. The silanes can also be polysilthienes in which the silicons are bonded through sulfur atoms and each silicon has a beta-(vinylphenyl) ethyl radical attached thereto.

A second class of coupling agents which can be used in the present invention comprises titanates, which are described generally by the formula:

(RO)m—Ti—(OXR$^1$Y)n

Generally, an RO group will couple to the filler, and an (OXR$^1$ Y) group couples to the organic resin. For typical applications: R is a hydrocarbyl radical or a hydrocarbyl radical substituted with inert substituents such as a halogen, oxygen, sulfur, and phosphorous. Preferably R is a C1- to C10-hydrocarbyl radical, preferably an alkyl- or alkenyl-radical, and most preferably R is a C1 to C4 alkyl-radical such as methyl- or isopropyl-radical; X is an organic binder function group and is selected such that it becomes a permanent part of the polymer network after the resinous adhesive is set. For example, X is preferably a divalent phosphato-, pyrophosphato-, or sulfyl-group; $R^1$ is a thermoplastic functional group selected such that it is compatible with thermoplastic resins or thermosetting resins. $R^1$ typically includes a long carbon chain which provides for Van der Waals entanglements. Preferably $R^1$ is a hydrocarbyl radical or a hydrocarbyl radical substituted with an inert substituent such as those listed above as inert substituents, e.g., a C1 1 to C100 alkylene radical; Y is a thermoset functional group selected such that it becomes a permanent part of the polymer network after the resinous adhesive polymerizes. Y typically contains methacrylate or amine and m+n</=7.

Preferably m is 1 and n is 5. It is also noted that R, $R^1$, Y and X can each represent a plurality of different radicals in the same titanate coupling agent. The above coupling agents may terminate at the end of the R or R<1> groups with a reactive radical such as an acrylate, methacrylate or vinyl radical.

Usable titanate coupling agents are identified in U.S. Pat. No. 4,473,671, incorporated herein by reference. Specific examples include: isopropyl triisostearoyl titanate, isopropyl tri(lauryl-myristyl) titanate, isopropyl isostearoyl dimethylacryl titanate; isopropyl tri(dodecyl-benzenesulfonyl) titanate, isopropyl isostearoyl diacryl titanate, isopropyl tri(diisooctyl phosphate) tri(dioctypyrophosphato) titanate; and isopropyl triacroyl titanate.

A third class of coupling agents which can be employed in the present invention comprises zircoaluminates, which are described generally by the formula:

[Al$_2$(OR$^{10}$)aAbBc]x[OC(R$^2$)O]y[ZrAdBe]z

Such compounds are discussed in U.S. Pat. No. 4,539,048; incorporated herein by reference. In general: the [Al$_2$(OR$^1$O)a A b B c] groups are chelated aluminum moieties, the [OC(R$^2$)O] group is an organofunctional ligand, and the [ZrA d B e] groups are zirconium oxyhalide moieties. Typically, the organofunctional ligand is complexed with, and is chemically bound to, the chelated aluminum moiety and the zirconium moiety.

For the aluminum moiety,

A and B are preferably independently: hydroxy groups or a halogen, a, b, and c are preferably numerical values such that 2a+b+c=6, (OR$^1$ 0) is an alpha, beta- or alpha, gamma-glycol group in which $R^1$ is an alkyl-, alkenyl-, or alkynyl-group having one to six carbon atoms, preferably having 2–3 carbon atoms, or (OR$^1$ 0) is an alpha-hydroxy carboxylic acid residue according to the formula:

OCH(R$^3$)COOH

Wherein $R^3$ is H or an alkyl group having from 1 to 4 carbon atoms; $R^3$ preferably being —H or —CH3.

For the organofunctional moieties, —OC(R$^2$)O —, each $R^2$ is preferably: an alkyl-, alkenyl-, alkynyl- or arylalkyl-carboxylic acid having from 2 to 18 carbon atoms, and preferably from 2 to 6 carbon atoms; an amino functional carboxylic acid having from 2 to 18, and preferably from 2 to 6 carbon atoms; a dibasic carboxylic acid having from 2 to 18, and more preferably from 2 to 6 carbon atoms; an acid anhydride of a dibasic acid having from 2 to 6 carbon atoms, most preferably where both carboxy groups are terminal; a mercapto functional carboxylic acid having from 2 to 18 carbon atoms, and preferably from 2 to 6 carbon atoms; an epoxy functional carboxylic acid having from 2 to 18 and preferably 2 to 6 carbon atoms; or, an acid anhydride of a dibasic acid having from 2 to 18, and preferably 2 to 6 carbon atoms.

An extensive variety of —OC(R$^2$)O— anionic ligands are known and can be used. Examples of specific dibasic anions are: oxalic, malonic, succinic, glutonic, adipic, tartaric, itaconic, maleic, fumaric, phthalic and terphthalic anions. Examples of specific aminofunctional carboxylate anions include the anions of: glycine, alanine, beta-alanine, valine, leucine, isoleucine, phenylalanine, tyrosine, serine, threonine, methionine, cysteine, cystine, proline, hydroxyproline, and, aspartic and glutaric acids. Examples of specific useful monobasic carboxylic acid moieties include the anions of the following carboxylic acids: acetic, propionic, butyric, pentanoic, hexanoic, heptanoic, octanoic, dodecanoic, myristic, palmitic, stearic, isostearic, propenoic, 2-methylpropenoic, butenoic, hexenoic, benzoic, and cinnamic.

For the zirconium oxyhalide moiety preferably:

A and B are hydroxy groups or halogens; d and e are numerical values such that d+e=4; the molar ratio of chelated aluminum moiety to zirconium oxyhalide moiety is from about 1.5 to 10; the molar ratio of organofunctional ligand to total metal is from about 0.05 to 2, and preferably about 0.1 to 0.5; and x, y, and z are each at least one.

Application

In applying the process of the present invention, it is desired to inject sufficient preflush material to invade the formation and essentially fill the pore space of the formation from the wellbore extending into the formation for a distance of from 1 to 12 inches.

The quantity of the preflush injected into the formation varies depending on the thickness and porosity of the formation to which the sand consolidation process is to be applied, as well as the diameter of the well and the desired thickness of the permeable barrier in the formation. The thickness and porosity of the formation and the diameter of the well will always be known.

As a general guideline it is sufficient if from ⅛ to ½ and preferably from ⅕ to ⅓ gallons of preflush is injected prior to the polymerization chemical, per foot of formation interval being treated with the sand consolidation procedure.

If, for example, it is desire to treat a formation where the thickness is 18 feet and porosity 35% to form a permeable barrier just outside the wellbore which is 8 inches thick, and the well being treated is 10 inches in diameter, then the volume necessary is calculated according to the sample below. It is desired to inject sufficient preflush to fill the pore to the wellbore face and extend twelve inches into the formation.

$$\text{Volume in cubic feet equals } \frac{\pi\left(\frac{10}{2}+8\right)^2 - \pi\left(\frac{10}{2}+8\right)^2}{144} \times$$

$$(\text{Ht.}) \times \frac{(\text{Porosity} \times (0.20) = 3.14\,(13)_2 - 3.14\,(5)^2}{144} \times 18 \times (.35) \times (0.20)$$

equals 3.985 cubic feet=29.6 gallons of the consolidating fluid comprising monomer, diluent and acid.

After injection of the preflush the particulates which are sought to be consolidated are cleaned and primed for maximum coverage. Next the resin system is injected. Resin systems or consolidating fluids have been discussed, for example, in U.S. Pat. Nos. 5,010,953; 5,199,492; 4,427,069; 4,938,287; and 5,199,490, all incorporated herein by reference in their entirety.

The resin system preferably comprises 60.0 to 90.0 percent by weight resin in its commercial form, 15 to 30 percent by weight ester, such as butyl acetate, and from 0.01 to 5.0 percent by weight of any acid catalyst, e.g., o-nitrobenzoic acid or toluene sulfonic acid. A preferred method of formulating this solution is to mix the acid with the ester and then mix four parts of the resin emulsion with one part of the mixture of ester and acid.

Any acid known in the art can be used as the catalyst. The preferred internal acid catalyst used to catalyze polymerization of the resin is an oil soluble, very slightly water soluble organic acid. The most preferred acids are o-nitrobenzoic acid or toluene sulfonic acid. From 0.05 to 5.0 and preferably from 1.0 to 4.0 percent by weight of the slightly water soluble organic acid catalyst is incorporated in the resin solution used to coat the particles.

The resin solution and the sand or gravel are mixed together. It is preferred that the volume ratio of sand or gravel to resin solution is from 10 to 30, preferably 15.0 to 25.0. The sand or gravel and resin emulsion are mixed until the particles are thoroughly coated. The appearance and texture of the material produced by the procedure is a wet, tacky mass of coated particles.

A solution is prepared that contains about 80 percent resin and about 19 percent butyl acetate and from 0.8 to 1.2 percent acid catalyst such as o-nitrobenzoic acid or toluene sulfonic acid. Such a solution is used to coat the sand at the surface or in the well. The oil soluble internal catalyst can be mixed with the resin. The catalyst activity is highly dependent on temperature.

Any acid-catalyzed, polymerizable, resinous material which can be used to coat the particles, and then be suspended in the carrier fluid for placement in the formation cavity can be used in the invention. A particularly preferred resin is the furfuryl alcohol oligomer (C$_4$H$_3$OCH$_2$)xH, which is a relatively inexpensive polymerizable resin which autopolymerizes upon exposure to acid catalyst, forming a thermosetting resin, which cures to an insoluble mass highly resistant to chemical attack and thermal degradation. Specifically it is recommended that the resin used be Quacor 1300 Furan Resin marketed by Q. O. Chemical.

It may be desirable to dilute the furfuryl alcohol oligomer with an appropriate solvent such as butyl acetate to decrease viscosity of the fluid such that it can more easily coat the particles.

As the furfuryl alcohol oligomer comes into contact with the acidic catalyst, the action of the heat in the formation and catalyst drives the autopolymerization reaction forward. Thus, the alcohol oligomer polymerizes to a solid mass.

As the polymerization reaction proceeds, water is produced as a by-product. If this water production is allowed to go unchecked, the polymerization reaction will soon equilibrate:

By providing an ester of a weak organic acid in the reaction mixture, the by-product water is consumed in a hydrolysis reaction of the ester to its corresponding alcohol and carboxylic acid. For example, the inclusion of an ester of a weak organic acid, widely available as inexpensive organic solvents, with the polymerizable resin composition serves both as the solvating agent for the polymerizable resin and as an ester to check water production. Accordingly, the polymerization reaction is driven to the desired degree of completion by the uptake of water in the ester hydrolysis reaction.

The amount of resin coated on the sand or gravel particles as a percent of the weight of particulate and resin is from 2 to 10 percent and the catalyst content as a percent of resin is from 1.0 to 5.0 percent. These concentrations can of course be varied depending on individual characteristics of the selected resin and catalyst as well as conditions encountered in the particular application.

The resin, butyl acetate and nitrobenzoic acid, mixture is used to accomplish a thorough coating of the sand grains.

Next, an aqueous saline solution which is from 70% to 100% saturated with inorganic salt, preferably sodium chloride, is injected into the resin saturated zone of the formation. This injection step accomplishes an opening of flow channels within the void spaces in the formation into which the resin catalyst mixture and is injected without removing the polymerizable resin. This would occur with >70% salt solution, which is important to ensure that the resulting polymerized resin bonded sand matrix is sufficiently permeable to permit flow of formation fluids from the formation after the sand consolidation process is completed. The salt water also modifies the resin coating on the sand, and removes water which increases the strength and durability of the polymerized resin matrix.

The well is then shut in for a period of from 1 to 10 days, preferably at least one week. The preferred shut-in period is a function of the formation temperature. This procedure results in the formation of a permeable, durable, consolidated sand mass around the perforations of the wellbore which restrains the movement of sand into the wellbore during production operations, while permitting relatively free flow of formation fluids, particularly formation petroleum, into the wellbore. The thickness of the permeable mass formed around the perforations of the production well casing is determined by the volume of the fluid comprising the polymerizing resin and catalyst injected into the formation.

The following examples are given as specific illustrations of the invention. It should be understood, however, that the invention is not limited to the specific details set forth in the examples.

Experimental Section

To demonstrate the invention a preflush using just butyl acetate was applied. When the butyl acetate preflush was employed, microscopic examination of grains after consolidation revealed the sand grains were approximately 35 to 40% coated. The sand grains were tested by Compressive Strength Testing which is a standard test known to those of ordinary skill in the art.

When a preflush fitting the description of this invention was used the sand grains were approximately 80% coated.

The preflush which was employed comprised 80% butyl acetate, 19% furan resin and 1% silane. This composition did two things. The solvent properties dissolved oil and undesirable materials from the sand grains and the furan resin and coupling agent made it possible for more resin to adhere to the sand grains.

Field Experiment

A producing well is completed in a subterranean petroleum containing formation, the formation being from 2,540 to 2,588 feet. Considerable sand production has been experienced in other wells completed in this formation in the past, and so it is contemplated that some treatment must be applied in order to permit oil production from this formation without experiencing the various problems of unconsolidated and production. This particular well has not been used for oil production, and so little sand has been produced from the formation. It is known that the sand is coated with viscous formation crude, but is otherwise of a reasonable particle size to accommodate sand consolidation process using the natural sand present in the formation. Because of the viscous oil residue on the sand grains, and a significant water saturation in the formation where the consolidation is to be conducted, it is felt that satisfactory sand consolidation results can only be achieved if a preflush is applied to the formation prior to the injection of the polymerizable alcohol.

It is desired to inject sufficient preflush to fill the pore space of a cylindrical portion of the formation adjacent to the wellbore face and extending twelve inches into the formation. The wellbore diameter is ten inches and the porosity is 40 percent. The volume of preflush required is:

$$3.14 \left( \frac{10}{2} + 12 \right)^2 - 3.14 \left( \frac{10}{2} \right)^2 \times (0.40)(48) =$$

$$\underline{3.14\,(17)^2 - 3.14\,(5)^2} \times (.40)(48) = 110.53 \text{ Cu. Ft. or 826 gallons}$$

For this purpose about 660 (80%) gallons of butyl acetate, 159 gallons of furan resin and 8.3 gallons of silane were employed.

The sand consolidation fluid is injected into the formation at a rate of 1440 gallons/hour. After the preflush and all of the treating fluid has been injected into the formation, the well is shut in for 6 hours to ensure complete polymerization. At the conclusion of this shut-in period, the well is placed on production and essentially sand-free oil production is obtained.

Although the invention has been described in terms of a series of specific preferred embodiments and illustrative examples which applicants believe to include the best mode known for applying the invention at the time of this application, it will be recognized to those skilled in the art that various modifications may be made to the composition and methods described herein without departing from the true spirit and scope of our invention which is defined more precisely in the claims appended hereinafter below.

I claim:

1. A method for consolidating unconsolidated mineral particles with a resin in a subterranean petroleum formation, the formation being penetrated by a well which forms a fluid communication between a point on the surface and at least a portion of the formation, the method comprising:

introducing into the formation an effective amount of a preflush, said amount of preflush being sufficient to invade substantially all of the pore spaces of a portion of the formation to be consolidated, wherein said preflush comprises an oligomer or monomer of the resin to be used in the sand consolidating fluid;

introducing a non-aqueous sand consolidating fluid into substantially the same portion of the formation as the preflush fluid, introducing an aqueous saline solution into substantially the same portion of the formation as the non-aqueous sand consolidating fluid, and allowing the sand consolidating fluid to remain in the formation for a period of time sufficient to accomplish at least partial polymerization, forming a permeable consolidated mass around the wellbore.

2. The method of claim 1 wherein the preflush further comprises an ester.

3. The method of claim 1 wherein the sand consolidating fluid comprises a polymerizable compound, a diluent for the polymerizable compound and an acid catalyst capable of causing condensation polymerization of the compound at fluid injection temperatures.

4. The method of claim 1 wherein the monomer or oligomer in the preflush is selected from furfuryl alcohol and furfural.

5. The method of claim 2 wherein the ester in the preflush is selected from the group consisting of ethyl acetate and butyl acetate.

6. The method of claim 2 wherein the preflush further comprises a coupling agent.

7. The method of claim 6 wherein the preflush fluid comprises 50–90% ester, 10–30% resin and 0–5% coupling agent.

8. The method of claim 6 wherein the preflush comprises 10 to 20% ester, 80–70% furfuryl alcohol or furfural; and 0–5% coupling agent.

9. The method of claim 7 wherein the preflush comprises about 80% butyl acetate, 19% furan resin and 1% silane.

10. The method of claim 6 wherein the coupling agent is selected from the group consisting of silanes, titanates and zircoaluminates.

11. The method of claim 10 wherein the coupling agent is a silane.

12. The method of claim 11, wherein the silane is represented by the formula $X_3SiR^1 Y$ wherein $R^1$ is an alkyl group, Y is an organofunctional group and X is a hydrolyzable group.

13. A composition useful as a preflush fluid used prior to introducing a sand consolidation fluid, said composition comprising:
   a) 20–80% by weight of an alkyl ester having 1 to 6 carbons;
   b) 80–20% by weight of a monomer or oligomer of a resin selected from furfural and furfuryl alcohol; and
   c) 0–5% by weight of a coupling agent selected from the group consisting of silanes, titanates and zircoaluminumates.

14. A method for consolidating unconsolidated mineral particles with a resin in a subterranean petroleum formation, the formation being penetrated by a well which forms a fluid communication between a point on the surface and at least a portion of the formation, the method comprising:

introducing into the formation an effective amount of a preflush, said amount of preflush being sufficient to invade substantially all of the pore spaces of a portion of the formation to be consolidated, wherein said preflush comprises an oligomer or monomer of the resin to be used in the sand consolidating fluid, and a diluent for the oligomer or monomer of the resin;

introducing a sand consolidating fluid into substantially the same portion of the formation as the preflush fluid, wherein the sand consolidating fluid comprises a polymerizable compound, a diluent for the polymerizable compound and an acid catalyst capable of causing condensation polymerization of the compound at fluid injection temperatures, introducing an aqueous saline solution into substantially the same portion of the formation as the sand consolidating fluid, and allowing the sand consolidating fluid to remain in the formation for a period of time sufficient to accomplish at least partial polymerization, forming a permeable consolidated mass around the wellbore.

15. The method of claim 14 wherein the preflush further comprises a coupling agent selected from the group consisting of silanes, titanates and zircoaluminumates.

16. The method of claim 15 wherein the preflush fluid comprises
   20–80% by weight of a diluent, the diluent being an alkyl ester having 1 to 6 carbons;
   80–20% by weight of a monomer or oligomer of a resin selected from furfural and furfuryl alcohol; and
   0–5% by weight of a coupling agent.

* * * * *